US006391364B1

(12) United States Patent
Lindsay

(10) Patent No.: US 6,391,364 B1
(45) Date of Patent: May 21, 2002

(54) FREE ALKYLPHENOL FLAVOR ADDITIVES

(75) Inventor: Robert C. Lindsay, Madison, WI (US)

(73) Assignee: Whole Flavors, LLC, Madison, WI (US)

( * ) Notice: Subject to any disclaimer, the term of this patent is extended or adjusted under 35 U.S.C. 154(b) by 0 days.

(21) Appl. No.: 09/336,344

(22) Filed: Jun. 18, 1999

(51) Int. Cl.$^7$ .................................................. A23L 1/22

(52) U.S. Cl. ..................... 426/534; 426/580; 426/583; 426/650

(58) Field of Search ................................ 426/534, 650, 426/580, 583, 588

(56) References Cited

U.S. PATENT DOCUMENTS

| | | | |
|---|---|---|---|
| 2,414,299 A | * 1/1947 | Hall | ................. 426/650 |
| 3,000,743 A | * 9/1961 | Tolin | ................. 426/650 |
| 3,520,699 A | 7/1970 | Gerardus | |
| 3,857,977 A | 12/1974 | Huessy | |
| 3,947,603 A | 3/1976 | Winter et al. | |
| 4,165,391 A | 8/1979 | Corbett nee Rolison | |
| 4,826,693 A | 5/1989 | Smith | |
| 5,104,678 A | 4/1992 | Yang | |
| 5,106,644 A | 4/1992 | El-Nokaly | |
| 5,217,741 A | 6/1993 | Kawachi et al. | |
| 5,294,451 A | 3/1994 | Meyer et al. | |
| 5,338,562 A | 8/1994 | Humphreys | |
| 5,395,638 A | 3/1995 | Kincs et al. | |
| 5,413,804 A | 5/1995 | Rhodes | |
| 5,462,755 A | 10/1995 | Mehnert | |
| 5,597,605 A | 1/1997 | Mazurek | |
| 5,904,947 A | 5/1999 | Jensen et al. | |

FOREIGN PATENT DOCUMENTS

| | | |
|---|---|---|
| CH | 523 664 | 7/1972 |
| EP | 0 766 925 A2 | 4/1997 |
| EP | 1 013 177 A1 | 6/2000 |

OTHER PUBLICATIONS

Fennema, O.R., Food Chemistry, Second Edition, p. 355, 1985, Marcel Dekker, Inc., New York, 1985.*
Heil et al., A Method for Quantitative Analysis for Flavor–Tainting Alkylphenols and Aromatic Thiols in Fish, *Journal of Environmental Science and Health,* B23(5):475–488 (1988).
Brennand, Factors Affecting Contributions of Volatile Branched–Chain Fatty Aids to the Species–Related Flavors of Lamb and Mutton, University of Wisconsin–Madison, 1989.
Ha, Role of Volatile Branched–Chain Fatty Acids in Characteristics Dairy, Meat, and Other Flavors, University of Wisconsin–Madison, 1989.
Tyman et al., The Extraction of Natural Cashew Nut–Shell Liquid from the Cashew Nut, JAOCS 66, No. 4:553–557 (1989).

Ha et al., Contributions of Cow, Sheep and Goat Milks to Characterizing Branched–Chain Fatty Acid and Phenolic Flavors in Varietal Cheeses, *Journal of Dairy Science* 74:3267–3274 (1991).
Ha et al., Volatile Alkylphenols and Thiophenol in Species–related Characterizing Flavors of Red Meats, *Journal of Food Science* 56, No. 5:1197–1202 (1991).
Ha et al., Volatile Branched–chain Fatty Acids and Phenotic Compounds in Aged Italian Cheese Flavors, *Journal of Food Science* 56, No. 5:1241–1247 (1991).
Lopez, The Role of Phenols and Conjugates in the Flavor of Milk From Various Species, University of Wisconsin–Madison, 1992.
Lopez et al., Metabolic Conjugates as Precursors for Characterizing Flavor Compounds in Ruminant Milks, *J. Agric. Food Chem. 41,* No. 3:446–454 (1993).
Lopez et al., Thermal Stability of Some Metabolically Conjugated Potential Precursors of Flavor Components in Meat and Milk, *Journal of Food Science* 58, No. 2:292–295 (1993).
Han, Measurement of Alkylphenols in Fatty Foods, University of Wisconsin–Madison, 1994.
Lindsay et al., Investigation of Baked Milkfat Flavor Development in Milkfat Ingredients for the Bakery and Food Industries, CDR Annual Report, 1995.
Han et al., Stability of Metabolically Conjugated Precursors of Meat and Milk Flavor Compounds in Various Solvents, *Journal of Food Science* 60, No. 5:1103, 1119 (1995).
Lindsay, Bake–Through Butter Flavor, Wisconsin Center for Dairy Research, 2pgs., 1996.
Lindsay, Butter Flavor Technologies and Applications, Milkfat Technology Forum Proceedings, 59–63, 1996.
Wisconsin Center For Dairy Research, The Cutting Edge, vol. 1, 12 pgs., CDR Communications, 1996.
Lindsay, Flavors, *Food Chemistry Third Edition,* 1996, p 752, 753, 723.
Lindsay, Milkfat Flavor (Butter Flavor), Center for Dairy Research—University of Wisconsin–Madison, 10pgs., 1996.
Soenaryo, Factors Influencing the Utilization of Concentrated Milk–Derived Alkylphenol Flavors, University of Wisconsin–Madison, 1997.
Zeng, Influence of Milkfat on the Formation of Flavor Compounds in Cheddar Cheese, University of Wisconsin–Madison, 1997.
Ingredients, Dairy Ingredients, *Food Technology Europe,* 17–19 (1998).

(List continued on next page.)

Primary Examiner—Leslie Wong
(74) Attorney, Agent, or Firm—Michael Best & Friedrich, LLP

(57) ABSTRACT

A process for preparing a free alkylphenol flavor concentrate, including the steps of reacting an aqueous solution comprising a raw material containing bound alkylphenol conjugates with a mineral acid, and the use of free alkylphenols and free alkylphenol concentrates as flavor enhancers in a wide variety of food products.

9 Claims, 3 Drawing Sheets

OTHER PUBLICATIONS

Lindsay, Milkfat Flavor II (Butter Flavor), Center for Dairy Research—University of Wisconsin–Madison, 9pgs., 1998.

Kubo et al., Anti-*Helicobacter pylori* Agents from the Cashew Apple, *J. Agric. Food Chem.* 47, No. 2:533–537 (1999).

Flavors & Fragrances, *CA Selects Plus: Flavors & Fragrances,* No. 4:20, American Chemical Society (1999).

Parliment et al., Critical Flavor Compounds in Dairy Products, *Flavor Chemistry Industrial and Academic Research,* Chpt 4:44–71, American Chemical Society (2000).

PCT/ISA/210, International Search Report, 8 pgs.

Ha, et al., Volatile Alkylphenols and Thiophenol in Species–related Characterizing Flavors of Red Meats, Journal of Food Science, 56:5, pp. 1197–1202, 1991.

Ha, et al., Contributions of Cow, Sheep, and Goat Milks to Characterizing Branched–Chain Fatty Acid and Phenolic Flavors in Varietal Cheeses, Journal of Dairy Science, 74:10, pp. 3267–3274, 1991.

Jaggy, et al., Chemistry and biology of alkyphenols from Ginko biloba L., Pharmazie 52, pp. 735–738, 1997.

* cited by examiner

HPLC Alkylphenol Analysis of a Mixture of Synthetic Alkylphenols

Chromatogram of dansylated authentic alkylphenols on Lichrosorb ®Si 60 column. Mobile phase: 1.6% acetone in 2.2,4-trimethylpentane Flow rate: 1.5 ml/min. 1 = 2,6-diisopropylphenol; 2 = 2,5-diisopropylphenol; 3 = thymol; 4 = carvacrol; 5 = 2-isopropylphenol; 6 = 2-ethylphenol; 7 = 3-isopropylphenol; 8 = 4-isopropylphenol; 9 = o-cresol; 10 = 4-ethylphenol; 11 = 3-ethylphenol; 12 = p-cresol; 13 = m-cresol; 14 = phenol; 15 = 2-naphthol; 16 = first system peak; 17 = second system peak.

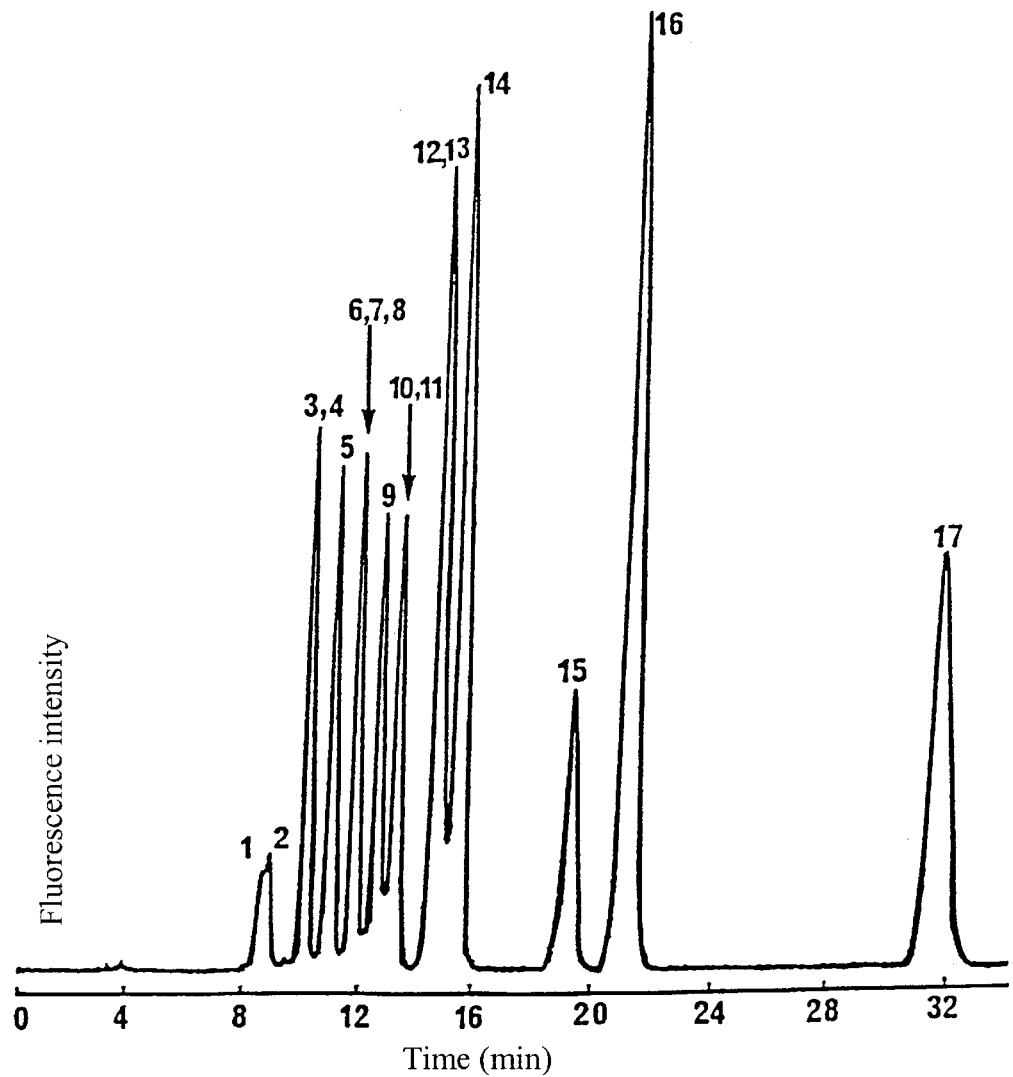

FIG. 1

HPLC Alkylphenol Analysis of Free Alkylphenol Concentrate
Prepared from Delactosed Whey Permeate Syrup and Sulfuric Acid
in Accordance with Example 8

CHANNEL A    INJECT        05:04:25

Internal Standard – o-cresol p/m-cresol phenol

05:04:25    CH- "A"   PS-  1.

FILE  1.     METHOD  0.     RUN  11     INDEX  11

| PEAK | AREA % | RT | AREA | BC |
|---|---|---|---|---|
| 1 | 0.055 | 3.34 | 3066 | 01 |
| 2 | 23.843 | 4.58 | 1317909 | 02 |
| 3 | 0.095 | 5.92 | 5239 | 02 |
| 4 | 0.058 | 6.21 | 3192 | 03 |
| 5 | 0.534 | 6.85 | 29504 | 01 |
| 6 | 3.287 | 8.02 | 181682 | 02 |
| 7 | 0.376 | 8.8 | 20780 | 03 |
| 8 | 0.045 | 10.2 | 2511 | 01 |
| 9 | 1.65 | 11.36 | 91216 | 02 |
| 10 | 5.837 | 12.14 | 267345 | 02 |
| 11 | 0.902 | 12.82 | 49840 | 03 |
| 12 | 2.441 | 14.14 | 134904 | 02 |
| 13 | 2.178 | 14.88 | 120405 | 02 |
| 14 | 3.404 | 15.82 | 188150 | 02 |
| 15 | 4.49 | 16.3 | 248296 | 02 |
| 16 | 0.50 | 17.37 | 28002 | 02 |
| 17 | 0.797 | 18.34 | 44076 | 03 |
| 18 | 50.387 | 20.22 | 2785079 | 01 |
| 19 | 0.111 | 23.12 | 6159 | 01 |
| Total | 100. | | 5527355 | |

HPLC Alkylphenol Analysis of Free Alkylphenol Concentrate
Prepared from Gusto® and Sulfuric Acid in Accordance with
Example 8

| Peak | Area % | RT | Area | BC |
|---|---|---|---|---|
| 1 | 30.431 | 2.82 | 1136610 | 01 |
| 2 | 0.436 | 5.36 | 16301 | 02 |
| 3 | 0.223 | 5.87 | 8341 | 02 |
| 4 | 0.072 | 6.8 | 2680 | 03 |
| 5 | 2.317 | 7.95 | 86537 | 02 |
| 6 | 0.362 | 8.72 | 13504 | 03 |
| 7 | 0.042 | 10.13 | 1563 | 01 |
| 8 | 1.027 | 11.29 | 38373 | 02 |
| 9 | 8.273 | 12.07 | 309001 | 02 |
| 10 | 1.535 | 12.74 | 57345 | 02 |
| 11 | 6.626 | 14.05 | 247485 | 02 |
| 12 | 3.191 | 14.78 | 119176 | 02 |
| 13 | 0.259 | 15.92 | 9642 | 02 |
| 14 | 0.708 | 16.21 | 26450 | 03 |
| 15 | 0.349 | 17.25 | 13012 | 01 |
| 16 | 44.151 | 20.09 | 1649072 | 01 |
| Total | 100. | | 3735092 | |

FREE ALKYLPHENOL FLAVOR ADDITIVES

BACKGROUND OF THE INVENTION

The present invention relates to a process for preparing free alkylphenol flavor concentrates. For the purpose of this invention free alkylphenol flavor concentrates are defined as free alkylphenol solutions resulting from the treatment of a naturally-occurring source of bound alkylphenol conjugates. Such concentrates and synthetic alkylphenols are used as additives in various food products for the enhancement of food flavors and food appearance. For the purpose of this invention alkylphenols are defined as phenols substituted with one or more saturated or unsaturated alkyl groups, where the groups can be the same or different. Alkylphenols are naturally produced in the digestive systems of dairy and meat animals, and are thus present in various food products, such as meats (Ha, J. K. and Lindsay, R. C. Volatile Alkylphenols and Thiophenol in Species-Related Characterizing Flavors of Red Meats, J. Food Sci. 56:1197 (1991) (incorporated herein by reference)); milks and cheeses (Ha, J. K. and Lindsay, R. C. Volatile Branched-Chain Fatty Acids and Phenolic Compounds in Aged Italian Cheese Flavors, J. Food Sci. 56:1241 (1991); Ha, J. K. and Lindsay, R. C. Contributions of Cow, Sheep and Goat Milks to Characterizing Branched-Chain Fatty Acids and Phenolic Flavors in Varietal Cheeses, J. Dairy Sci. 74:3267 (1991) (incorporated herein by reference)); cashews (Tyman, J. H. P. et al. The Extraction of Natural Cashew Nut-Shell Liquid from the Cashew Nut (Anacardium occidentale), J. Am. Oil Chem. Soc. 66:553 (1989)); and off-flavored fish (Heil, T. P. and Lindsay, R. C. A Method for Quantitative Analysis of Flavor-Tainting Alkylphenols and Aromatic Thiols in Fish, Environ. Sci. Health. B23:475–88 (1988) (incorporated herein by reference)). For example, various aged Italian cheeses contain many volatile, or "free" alkylphenols in concentrations ranging from 1 part per billion ("ppb") to 924 ppb, but the specific alkylphenols present, as well as their concentration, vary from cheese to cheese. (Ha, J. K. and Lindsay, R. C. Volatile Branched-Chain Fatty Acids and Phenolic Compounds in Aged Italian Cheese Flavors. J. Food Sci. 56:1241 (1991) (incorporated herein by reference)). P-cresol and m-cresol have also been found in butter oil at a concentration of 4.9 ppb and 3.3 ppb respectively. (Urbach et al., Die Isolierung und Bestimung von Phenol, o-Methoxyphenol und m-und p-Cresol in Butter, 18$^{th}$ Int. Dairy Congr., Sydney IE, 234 (1970)).

Alkylphenols have been identified as important components in the flavors of ruminant meats and dairy products. For the purpose of this invention, ruminant is defined as relating to a multiple-stomached animal, such as bovine, caprine and ovine. Alkylphenols are present in both the free and conjugate-bound forms, but only the free forms contribute to the flavor of the product. Alkylphenols are very potent flavor compounds, providing noticeable flavor at low parts per billion concentrations. Studies by Urbach showed that the addition of 2 ppb of p-cresol and 200 ppb of m-cresol to a model butter prepared from deodorized butter oil and distilled water, produced desirable flavor notes, but that undesirable flavors in the butter resulted from the use of p-cresol and m-cresol in amounts greater than 100 ppb and 1 part per million ("ppm") respectively. (Urbach et al., Volatile Compounds in Butter Oil, J. Dairy Res. 39:35 (1972)).

The free alkylphenols found in dairy products, such as milk, and in animal tissue are generally highly soluble in fats, such that when fats are removed from these products, the free alkylphenols are also substantially removed. As a result, such "fat free" products do not have the flavor of their fat-containing counterparts, making them less desirable to consumers.

The flavorful free alkylphenols naturally found in meat and dairy products are produced in the digestive tract via normal processes and/or via ingestion of feeds containing alkylphenols. However, most of the alkylphenols found in milk, urine and animal tissue are metabolic conjugates, such as glucuronides, sulfates, and phosphates, which are not believed to have much, if any, flavor effect. Therefore, lab-scale methods have been developed to produce free alkylphenols from these alkylphenol conjugates, including enzyme hydrolysis using β-D glucuronidase, arylsulfatase, and acid phosphatase, simultaneous distillation extraction and adsorption.

Moreover, despite the fact that free alkylphenols are recognized as contributing flavors to food products, to date these compounds have not been used as flavor enhancers in the food industry because usefulness of the free alkylphenols as flavor enhancers for "fat free" or "reduced fat" products has not yet been recognized. In addition, the above processes for isolating free alkylphenols from food products such as milk and animal tissue are difficult, expensive and time consuming, and have only been accomplished on a small scale.

Therefore, a process for producing free alkylphenol flavor concentrates from raw materials containing bound alkylphenol conjugates that is efficient, simple, inexpensive, and that can be performed on a large scale is needed. A process for using these free alkylphenol flavor concentrates as flavor enhancers in food products, especially "fat free" or "reduced fat" products, is also needed. A process for using synthetic alkylphenols as flavor enhancers in food products, especially "fat free" or "reduced fat" products, is also needed. A "fat free" or "reduced fat" food product with a flavor substantially matching that of its counterpart wherein the fat has not been removed is needed. Further, there is a need for a free alkylphenol flavor concentrate that can enhance the appearance of food products and be applied in a controlled manner to impact flavor and color in desired locations in or on the food product.

These needs are met by the present invention.

SUMMARY OF THE INVENTION

A process for producing free alkylphenols from raw materials containing bound alkylphenol conjugates and the subsequent recovery of the free alkylphenols as a free alkylphenol flavor and color concentrate has been discovered. In addition, applications of free alkylphenols, both in synthetic form and as a free alkylphenol flavor concentrate derived from the above process, as flavor enhancers in various food products have been discovered. The release of the bound alkylphenols from their non-flavorful conjugates provides the active flavorful compounds that are present in dairy and ruminant meat products in low concentrations. These free alkylphenols, when added in the appropriate amounts to food products provide the characteristic flavors of these foods. Therefore, even "fat free" or "reduced fat" food products will have a flavor substantially matching that of their counterparts wherein the fat has not been removed.

In the process of the present invention, the free alkylphenols are released from their bound form by reacting raw materials containing bound alkylphenol conjugates with a strong acid, such as sulfuric acid, phosphoric acid or hydrochloric acid, mineral to effect hydrolysis of the alkylphenol conjugates. Preferably, a reacting time period is used to cause sufficient degradation and/or polymerization of interfering flavors, proteins and carbohydrates present in the raw material to avoid sweet molasses-like flavor notes. The sufficient time period is normally about one to about eight hours. The resulting hydrolyzed free alkylphenol flavor concentrates may be partially neutralized with a base, such as sodium hydroxide, sodium carbonate, ammonium hydroxide, sodium bicarbonate, potassium hydroxide or potassium carbonate, if desired.

The free alkylphenol flavor concentrates should then be analyzed to determine the profile, or types and concentration of free alkylphenols present in the concentrate. It is essential to control the concentration of alkylphenols that are added via the free alkylphenol flavor concentrates, and to do this, the concentration of alkyphenols in the free alkylphenol flavor concentrates must be known. Various analytical techniques can be used to determine the profile, such as high performance liquid chromatography (HPLC), gas chromatography (GC) and extraction. This profile, which will vary depending on the raw material to used in the process and even within different batches of the same type of raw material, allows the user to determine the amount of free alkylphenol flavor concentrate to be added to a given food product to produce a food product having a taste that is pleasing to consumers.

The free alkylphenol flavor concentrates of the present invention are stable for an indefinite amount of time and small additions in the parts per billion concentration range are used to impart dairy or meat flavors or a richness to applications including meats; dairy products, such as butter, milks, aged cheese, cream cheese, ice milks, etc.; chocolate products; soy-product meat substitutes; baked, fried or microwaved goods; animal foods; and many others. The free alkylphenol flavor concentrates of the present invention are particularly useful in "fat free" or "reduced fat" food products. Other flavors may be combined with the free alkylphenol flavor concentrates to provide more complete natural flavors.

Synthetic alkylphenols, either individually or in combination, may be used to provide the same flavor effects as the natural alkyiphenols without the addition of fat. Among the alkylphenols useful in this application are p-cresol, m-cresol, p-ethylphenol, m-ethylphenol, and m-propylphenol.

Since the presence of these metabolic conjugates and corresponding free compounds in milk, meat, poultry, fish, and seafoods depends on the amount of metabolic conjugates ingested by the animal and the natural metabolic processes of the animal, considerable variation in the concentrations will be found in these foods. Thus, feeding and culturing practices greatly affect the flavor potential of resulting food products, and intensive production and culturing practices often result in alteration of traditional flavors associated with milk, meat, poultry, fish, and seafood products.

Further objects, features and advantages of the invention will be apparent from the following detailed description.

DESCRIPTION OF THE PREFERRED EMBODIMENTS

One process of the present invention for preparing free alkylphenol flavor concentrates includes reacting a raw material containing bound alkylphenol conjugates and a strong acid in an aqueous solution to hydrolyze the alkylphenol conjugates into their free alkylphenol counterparts.

The reaction should proceed for a period of time sufficient to effect hydrolysis of the bound alkylphenol conjugates to the free alkylphenols, generally this process takes at least about one hour. However, the amount of time necessary to effect sufficient hydrolysis is dependent upon the pH of the solution and the temperature, if any, to which the solution is heated. The amount of time necessary to effect sufficient hydrolysis is also dependent on the raw material used. For example, the concentration of alkylphenols varies from one raw material to the next and from one batch of the same type of raw material to the next. Also, the buffering capacities of the raw materials vary. Thus, the reaction time will vary depending upon the raw material used and the desired resultant concentration of free alkylphenol.

A preferred aqueous raw material solution should contain sufficient strong acid to achieve a pH of from about 1 to about 4, and more preferably, the pH should be from 1 to about 3. Although the solution does not need to be heated, preferably, the solution should be heated to a temperature of at least 50° C. Most preferably, the temperature should be from about 90° C. to about 121° C.

It is also preferred that the raw material solution containing bound alkylphenol conjugates is heated for an amount of time sufficient to both (1) hydrolyze a substantial amount of the alkylphenol conjugates in the solution to their free alkylphenol counterparts, and (2) cause the degradation and/or polymerization of interfering flavor compounds, proteins and carbohydrates in the raw material so that they do not contribute masking or distorting sweet, molasses-like flavor notes to the resulting concentrate. Preferably, the raw material is heated with a strong acid for about one to about eight hours. Again, however, the optimum time needed to achieve both effects is dependent upon the pH and temperature of the solution, and can be readily determined. The hydrolyzed free alkylphenol flavor concentrates may be partially neutralized with a base, if desired.

Raw materials that can be used in the process of the claimed invention include, but are not limited to, ruminant milk, buttermilk, whey, whey permeate, delactosed whey permeate, cashews, and ruminant urine, all of which contain bound alkylphenol conjugates.

The most preferred raw material is delactosed whey permeate, which is essentially a waste product from the production of whey protein ingredients and lactose. This raw material is preferred because it contains a high concentration of bound alkylphenol conjugates and is inexpensive. Different whey permeates have different bound alkylphenol conjugate profiles, and therefore, will result in different free alkylphenol flavor concentrates.

The strong acid can be any of the generally known strong acids, including mineral acids, such as sulfuric acid, phosphoric acid or hydrochloric acid. Preferably, the strong acid is sulfuric acid, phosphoric acid or hydrochloric acid. Preferably, sufficient strong acid should be added to achieve a pH of from about 1 to about 3 and a concentration of about 0.5 Normal to about 5 Normal.

The solution is preferably reacted for a time sufficient to form a free alkylphenol concentrate having a free alkylphenol concentration of at least about 500 ppb of p/m-cresol. Most preferably, the free alkylphenol concentration is at least about 2000 ppb of p/m-cresol.

After the solution has been reacted to hydrolyze a sufficient amount of the bound alkylphenol conjugates, and preferably, to cause the degradation and/or polymerization of a substantial amount of the interfering flavor compounds, proteins and carbohydrates in the raw material, the resulting free alkylphenol flavor concentrate can be neutralized with base. The free alkylphenol flavor concentrate is preferably neutralized just prior to use in an application where the acidic nature of the concentrate may present difficulties in the processing. While any base can be used, the preferred base is sodium hydroxide. Preferably, the base is added in sufficient quantity to produce a pH of from about 3.5 to about 5.

The free alkylphenol flavor concentrate is stable for an indefinite period of time at a pH less than or equal to about 3 and under either refrigerated or ambient conditions.

The free alkylphenol flavor concentrate obtained via the above-described process should next be analyzed to determine its "profile," or the specific types and concentrations of free alkylphenols present in the concentrate. Such analysis is important, because free alkylphenol flavor concentrates obtained from different raw materials, and even different batches of the same type of raw material will have different profiles. Moreover, to most accurately determine the proper amount of concentrate to be added to a given food product to achieve a given flavor consistency is required and it is desirable to know the concentrate profile.

The profile of the free alkylphenol flavor concentrate can be obtained via various analytical techniques, including HPLC, GC or extraction. Use of HPLC is preferred. It is essential to control the concentration of alkylphenols that are added via the free alkylphenol flavor concentrates, and to do this, the concentration of alkyphenols in the free alkylphenol flavor concentrates must be known. A rapid high performance liquid chromatography analysis procedure may be used for this purpose. Generally, free alkylphenols are extracted either on-line in the process or from an end product sample, and then are analyzed by fluorescence detection using precolumn derivatization with dansyl chloride. When analysis of total alkylphenols (free+conjugate-bound) is desired, the extracted conjugates are first hydrolyzed by a combination of enzyme and acid hydrolysis before derivatization. The detection limit of dansylated alkylphenols by this procedure is about 0.2 nanogram absolute amount. Calibration curves are linear for dansylated alkylphenols from the detection limit to about 60 nanograms for phenols and cresols injected, and 80 nanograms for other alkylphenols injected, and overall the correlation coefficient between added and recovered alkylphenols is 0.98 or higher. The internal standard utilized is o-cresol. The concentration of p/m-cresol in the sample is determined from the area under the curve using standard techniques. The total concentration of alkylphenols in the free alkylphenol flavor concentrate is based upon the concentration of p/m-cresol in the free alkylphenol flavor concentrate. (Zeng, Q. Influence of Milkfat on the Formation of Flavor Compounds in Cheddar Cheese. Ph.D. diss. University of Wisconsin-Madison (1997) (incorporated herein by reference).)

BRIEF DESCRIPTION OF THE DRAWINGS

Profiles of free alklphenol flavor concentrates obtained from various raw materials are shown in FIGS. 1 to 3.

FIG. 1 shows the HPLC trace for a mixture of several synthetic alklphenols, with the peaks for the internal standard, p/m-cresol and phenol marked.

Figure 2:
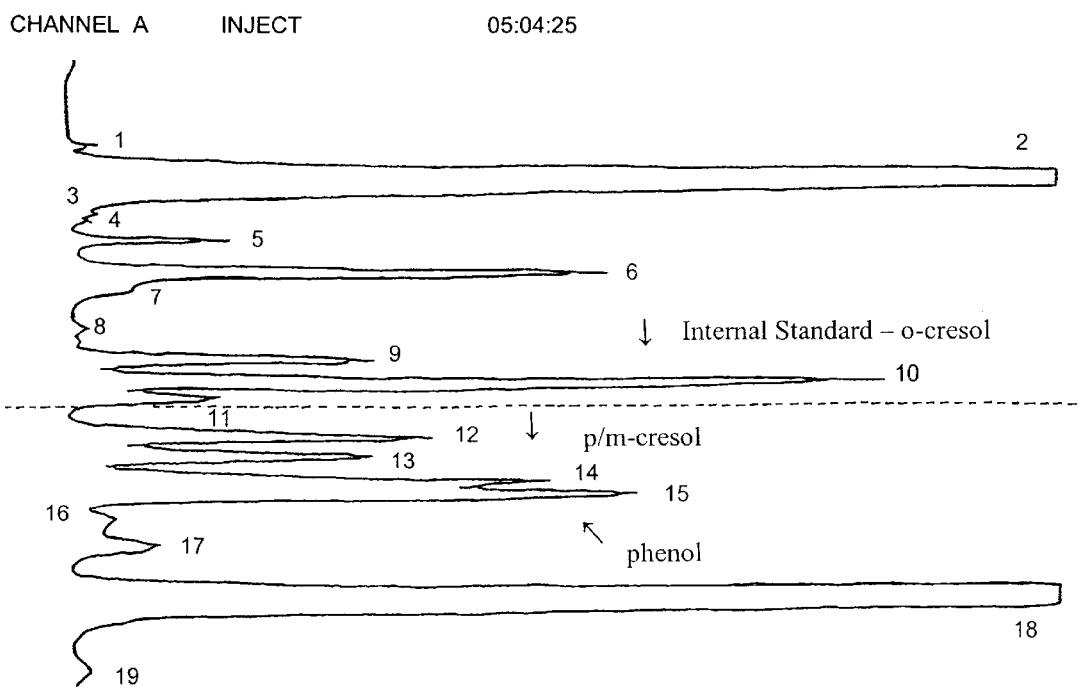
FIG. 2 shows the HPLC trace for a free alkylphenol flavor concentrate produced by the method in Example 4.
Figure 3:
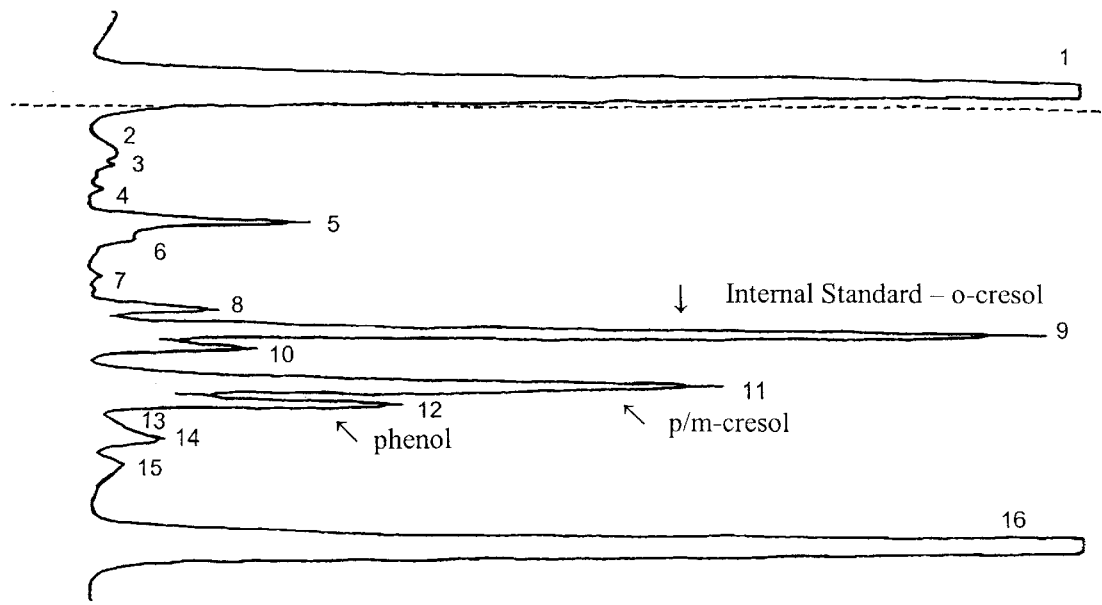
FIG. 3 shows the HPLC trace for a free alkylphenol flavor concentrate produced by the method in Example 8.

The present invention also provides a process for making food products having enhanced flavors, comprising adding varying amounts of one or more free alkylphenol flavor concentrates to the food product. As stated above, the amount of concentrate to be added depends on the concentrate profile, the nature of the food product that the concentrate is being added to, and the type of flavor that is desired. Generally however, addition of free alkylphenol flavor concentrate in an amount of at least about 0.05 ppb of p/m-cresol will provide a food product having an enhanced flavor that is desirable to consumers of the product. Preferably, the free alkylphenol flavor concentrate is added in an amount sufficient to result in from about 3 ppb to about 25 ppb of p/m-cresol in the food product.

The concentrates of the invention are particularly useful in imparting flavors to "fat free" or "reduced fat" products, such as skim or reduced fat milk, fat free or reduced fat ice cream products, soy-based products, "veggie" burgers and fat free or reduced fat cream cheese. Use of the concentrates in the proper amounts will provide a rich, beefy taste to soy and/or vegetable-based artificial meat products, and a fuller, creamier taste to fat free or reduced fat dairy products.

Other ingredients may also be added to the food product, including fatty acids, such as lipolyzed whole cream powder and lipolyzed butter oil, and oxidizing agents, such as pyrolyzed vegetable oil. These compounds help provide a more complete flavor profile.

The concentrates of the invention are generally used as follows. The free alkylphenol concentrate is added to the food product, together with any additional ingredients, and the resulting mixture is mixed, preferably until substantially homogeneous. In some food products, it may be desirable to apply the free alkylphenol concentrate to a discrete portion or portions of the food product, such as the surface, crust, ends or to an internal ingredient. In either method of application, the free alkylphenol concentrate may be a flavor enhancer or a color enhancer.

In another embodiment of the invention, synthetically produced alkylphenols can be used in lieu of or in combination with the free alkylphenol flavor concentrates to provide enhanced flavor to the above described food products. Because specific

TABLE 1

Flavor impact of individual alkylphenols added to deodorized oil (fresh vegetable oil).

| Alkylphenol | Concentration (ppb) | Panel comments[1] |
| --- | --- | --- |
| p.cresol | 50 | Sweet dairy taste |
|  | 200 | Animal-like, animal cage |
| m-cresol | 50 | Just perceptible |
|  | 100 | Pleasant, not significant |
|  | 200 | Sweet rich mouth coating |
| d-ethylphenol | 100 | Full, not significant |
|  | 200 | Dairy sweet (perceptible) |
| 3-ethylphenol | 12 | Slightly cowy |
|  | 25 | Sheepy - cowy |
|  | 50 | Sheepy |
|  | 200 | Sheep pen |
| 3-n-propylphenol | 5 | Creamy, sweet, fullness |
|  | 10 | Milky, nutty |
|  | 20 | Cowy |
| 3-n-butylphenol | 100 | Not significant |
|  | 200 | Sweet, rich mouth feel |

[1]Consensus of 2-4 experienced flavor evaluators.

TABLE 2

Flavor Impact of combinations of alkylphenols added to deodorized oil (fresh vegetable oil).

| Combination Alkylphenols | Concentration (ppb) | Panel comments[1] |
|---|---|---|
| m-cresol | 100 | Milky - cowy, too strong |
| 3-ethylphenol | 12 | |
| m-cresol | 50 | Milky - cowy, dairy sweet |
| 3-ethylphenol | 6 | |
| 4-ethylphenol | 100 | |
| m-cresol | 50 | Cowy, with creamy after taste |
| 3-ethylphenol | 6 | |
| 4-ethylphenol | 100 | |
| 3-n-ethylphenol | 10 | |
| m-cresol | 25 | Desirable, milky |
| 3-ethylphenol | 3 | |
| 4-ethylphenol | 50 | |
| 3-n-propylphenol | 5 | |
| m-cresol | 25 | Cowy detectable |
| 3-ethylphenol | 3 | |
| 4-ethylphenol | 50 | |
| 3-n-propylphenol | 5 | |
| p-cresol | 50 | |
| m-cresol | 12.5 | Desirable milky, balanced, well blend in sweet cream-like flavor |
| 3-ethylphenol | 1.5 | |
| 4-ethylphenol | 25 | |
| 3-n-propylphenol | 2.5 | |
| p-cresol | 25 | |

[1]Consensus of 2-4 experienced flavor evaluators.
Note: 5 ppb of 3-ethylphenol has almost same flavor profile with 0.5 ppb 3-α-pr.

TABLE 3

Flavor impact of alkylphenols in water solution.

| Alkylphenols | Concentration (ppb) | Panel comments[1] |
|---|---|---|
| p-cresol | 0.05 | Not detectable |
| | 0.1 | Not significant |
| | 0.5 | Perceptible |
| | 1.0 | Cowy - medicinal |
| m-cresol | 25 | Not detectable |
| | 50 | Fatty, positive |
| | 100 | Mouth coating, milky - cowy, wet cow hair |
| 3-ethylphenol | 0.05 | Not detectable |
| | 0.1 | Not significant |
| | 0.25 | Perceptible |
| | 0.5 | Positive, slightly sweet |
| | 1.0 | Sweet, milky after taste |
| | 0.5 | Distinct cowy |
| 3-n-butylphenol (63%) | 10 | Not detectable |
| | 50 | Perceptible |
| | 100 | Cowy |
| | 1000 | Unacceptable phenolic flavor |

[1]Consensus of 2-4 experienced flavor evaluators.

TABLE 4

Flavor impact of combination of alkylphenols in water solution.

| Combination alkylphenols | Concentration (ppb) | Panel comments[1] |
|---|---|---|
| p-cresol | 1.0 | Undesirable, too cowy |
| 3-n-propylphenol | 0.5 | |
| p-cresol | 1.0 | Milky - cowy |
| 3-n-propylphenol | 0.25 | |
| p-cresol | 1.0 | Desirable, dairy sweet |
| 3-n-propylphenol | 0.1 | |
| p-cresol | 5.0 | Cowy but not medicinal, |

TABLE 4-continued

Flavor impact of combination of alkylphenols in water solution.

| Combination alkylphenols | Concentration (ppb) | Panel comments[1] |
|---|---|---|
| 3-n-propylphenol | 0.5 | good mouth fee, sweet |
| p-cresol | 8.0 | Too cowy |
| 3-n-propylphenol | 1.0 | |
| p-cresol | 4.0 | Positive, but not distinct |
| 3-n-propylphenol | 0.5 | |
| 3-ethylphenol | 2.5 | |
| p-cresol | 50 | Sweet, creamy, rich, milky |
| 3-n-propylphenol | 1.0 | cowy after taste |
| 3-ethylphenol | 5.0 | |
| p-cresol | 10 | Sweet, milky - creamy |
| 3-n-propylphenol | 0.2 | |
| 3-ethylphenol | 1.0 | |

[1]Consensus of 2-4 experienced flavor evaluators.

TABLE 5

Taste qualities of 3-α-propylphenol spiked in various medium.

| Medium | Concentration (ppb) of 3-n-propylphenol | Taste description[1] |
|---|---|---|
| Skim milk | 0.1 | Below threshold |
| | 0.25 | Desirable (csp. with 30 ppm butyric acid |
| | 0.5 | Intense cowy |
| Butter oil (deodorized) | 10 | Desirable creamy, dairy sweet |
| | 5 | Rich, sweet |
| Butter | 8 | Desirable richness, fullness |
| | 10 | Slightly cowy |
| Margarine | 5 | Creamy, buttery |
| | 10 | Milky - cowy |
| Cookies | 3.6 | Stronger bake-butter flavor, milky |
| | 5 | Cowy after taste |
| Yogurt (sweet vanilla) | 0.25 | Sweeter, milky, smooth, reduce the tartness |
| | 0.5 | Smooth, too cowy |
| Cake mix (white cake) | 2 | Rich, milky |
| | 10 | Distinct cowy |
| | 20 | Extremely cowy |
| Pound cake (no dairy ingredient) | 5 | Notable cowyness |
| | 2.5 | Cowy perceptible |
| | 1.5 | Desirable milky, rich mouth feel |
| Low-fat ice-cream soft serve | 1 | More sweet, rich |
| | 1.5 | Desirable sweet dairy note |
| | 2.5 | Too cowy |
| | 10 | Intensely cowy, strong synthetic vanillin flavor |
| Toffee | 5 | Too cowy |
| | 2.5 | Cowy |
| | 1–1.5 | Desirable milky |
| Ground pork | 5 | Beef-like taste |
| | 10 | Cowy |
| | 20 | Medicinal |
| Ground chicken | 2.5 | Red meat taste |
| | 5 | Cowy |
| | 10 | Medicinal |

[1]Consensus of 2-4 experienced flavor evaluators.
Note: 70 ppb 4-butylphenol added in butter provides more milky, sweet, fullness mouth sensation.

TABLE 6

Flavor impact of selected alkylphenols in low-fat ice cream soft serve.

| Alkylphenol combinations | Concentration (ppb) | Taste descriptions[1] |
|---|---|---|
| 3-n-propylphenyl | 1 | Intense dairynote with cowy |
| 3-n-butylphenol | 40 | after taste |
| 3-n-propylphenyl | 0.5 | Slightly cowy |
| 3-n-butylphenol | 50 | |
| 3-n-propylphenyl | 0.5 | Cowy perceptible |
| 3-n-butylphenol | 25 | |
| 3-n-propylphenyl | 0.25 | Desirable, rich, creamy |
| 3-n-butylphenol | 12.5 | |
| 3-n-propylphenyl | 0.1 | Pleasant, balanced, full |
| 3-n-butylphenol | 6.0 | |
| m-cresol | 5 | Milky-creamy with |
| 3-ethylphenol | 0.6 | undesirable cowy - smoky |
| 4-ethylphenol | 10 | after taste |
| 5-n-propylphenol | 1 | |
| p-cresol | 10 | |
| m-cresol | 2.5 | Very desirable rich dairy |
| 3-ethylphenol | 0.3 | flavor |
| 4-ethylphenol | 5.0 | |
| 3-n-propylphenol | 0.5 | |
| p-cresol | 5.0 | |

[1]Consensus of 204 experienced flavor evaluators.

TABLE 7

Results of Adding 3-n-Propylphenol to Food Products

| Sample system | Amount (ppb) | Comment |
|---|---|---|
| Skim milk | 0.1 | Below threshold |
| | 0.25 | Desirable (csp, with 30 ppm butyric acid) |
| | 0.5 | Intense cowy |
| Butter oil | 10 | Desirable creamy "dairy sweet" |
| | 8 | Desirable, richness, fullness |
| | 10 | Little bit cowy |
| Margarine | 5 | Creamy, buttery |
| | 10 | Cowy |
| Cookies (made from butter oil-10 ppb-3 npr) | 3.6 (total ingredient) | Good bake-thru butter flavor, milky |
| Yogurt (sweet) | 0.25 | Sweeter, milky, reduce the tartness |
| | 0.5 | Too cowy |
| Fat-free ice cream | 2.0 | Cowy |
| | 0.5 | Distinct milky |
| | 0.25 | Desirable milky |
| Cake mix (white cake) | 10 | Extremely cow, should be reduced to 2.5–5 ppb |
| | 20 | |
| | 50 | |
| Pound cake (no dairy ingredient) | 5 | Notable cowyness |
| | 2.5 | Cowy detectable |
| | 1.5 | Desirable milky, rich mouth feeling |
| Toffee | 5 | Too cowy |
| | 2.5 | Cowy |
| | 1–1.5 | Desirable milky |

Table 8 shows that even impure alkylphenols provide the desired flavor notes.

TABLE 8

Result of adding 3-n Butylphenol (63% purity, with residual 4-n-butylphenol).

| Systems | Amount (mix. of 3, and 4-nbu) | Comment |
|---|---|---|
| Water | 1 ppm | Unacceptable phenolic flavor |
| | 100 ppb | Cowy note |
| | 50 ppb | Above threshold, good trial |
| | 10 ppb | Not detectable |
| Butter | 70 ppb | More milky. fullness mouth feeling |

As stated above, specific flavors can be targeted by the use of specific alkylphenols. For example, m-cresol and 3-n-propylphenol are important in characterizing flavors of meat and milk from these cows, sheep and goats. Examples of mn-substituted phenols are as follows: (1) 3-n-propylpphenol which has a distinctive dairy or beefy note and provides a beefiness to beef and tallow-fried french fries; butteriness to butter, baked butter cookie flavors butter toffee flavor; richness to ice cream, milk, butter and other dairy products; and (2) 3-ethylphenol and 3-methylphenol provide supporting richness flavors. All three of these m-substituted alkylphenols are highly soluble in fats, and as a result, their contributions of richness and dairy or beefy flavors are lost when fats are removed from meat and dairy products. Addition of these compounds, in the proper amounts to "fat free" and "reduced fat" food products will provide richness.

In a third embodiment of the invention, the raw materials containing bound alkylphenol conjugates can be applied to food products prior to frying in oil. Among the raw materials useful in this application is whey permeate, especially spray-dried whey permeate. Other ingredients may be added in this application, including free alkylphenol flavor concentrates, synthetic alkylphenols and lipolyzed butter oil. Tables 9 and 10 show the effect of addition of synthetic alkylphenols to french fries.

TABLE 9

French fries (Frying vegetable oil)

| Compound | Amount | Comment |
|---|---|---|
| 3-n-propylphenol | 5 ppb | Sweet, buttery |
| 3-n-propylphenol | 5 ppb | p-cresol notable |
| butyric acid | 30 ppm | |
| p-cresol | 20 ppb | |
| 3-n-propylphenol | 5 ppb | Animal odor |
| butyric acid | 30 ppm | Sheepy |
| p-cresol | 20 ppb | |
| 4-methyl octanoic acid | 50 ppm | |
| 3-n-propylphenol | 7.5 ppb | Sheepy |
| butyric acid | 30 ppm | Should increase 3 npr |
| p-cresol | 10 ppb | |
| 4-methyl octanoic acid | 5 ppm | |
| 3-n-propylphenol | 12 ppb | Pretty good, but still has sheepy note. |
| butyric acid | 30 ppm | |
| p-cresol | 10 ppb | Need more 3 npr |
| 4-methyl octanoic acid | 5 ppm | |
| 3-n-propylphenol | 15 ppb (optimum) | 3 npr note |
| butyric acid | 30 ppm | 4mcC8 acid can be increased a little bit |
| p-cresol | 10 ppb | |
| 4-methyl octanoic acid | 1 ppm | |
| 3-n-propylphenol | 12 ppb | Good. but slightly sleepy |
| butyric acid | 30 ppm | |

TABLE 9-continued

French fries (Frying vegetable oil)

| Compound | Amount | Comment |
|---|---|---|
| p-cresol | 10 ppb | |
| 4-methyl octanoic acid | 2.8 ppm | |
| 3-n-propylphenol | 12 ppb | Best trial |
| butyric acid | 30 ppm | |
| p-cresol | 10 ppb | |
| 4-methyl octanoic acid | 1.8 ppm optimum | |
| 3-n-propylphenol | 15 ppb | |
| butyric acid | 5 ppm | |
| p-cresol | 10 ppb | |
| 4-methyl octanoic acid | 1 ppm | |

TABLE 10

Final product: Flavored concentrated vegetable oil

| 3-n-propylphenol | 1.5 ppm | 5–10 ml to make 1 L frying oil |
|---|---|---|
| butyric acid | 500 ppm | (suggest amount: 8 ml) |
| p-cresol | 1.0 ppm | |
| 4-methyl octanoic acid | 100 ppm | |

In another embodiment of the invention, the free alkylphenol flavor concentrates or synthetic alkylphenols can be added to pet foods to enhance palatability.

In yet another embodiment of the invention, the free alkylphenol flavor concentrates or synthetic alkylphenols can be added to food products cooked and/or is heated using microwave radiation.

The alkylphenol additives can be selectively applied to foods, as well. In these embodiments, the alkylphenol additives can be applied to the surfaces of foods, for example, to provide localized enhanced taste to the food surface, such as in a crust. It is also noted that enhanced coloring of the food product can be achieved using the alkylphenol additives. Again, the additives can be mixed to form a homogenous product or the additives can be selectively applied to enhance surface color in crusts or meats, for example. This latter approach can significantly improve browning characteristics in microwaved foods where the microwave cooking process fails to brown food naturally.

In another embodiment of the invention, alkylphenols can be reacted with from about 5 to about 5000 parts per million active chlorine (for example, sodium hypochlorite) or hydrogen peroxide in a tapwater solution, optionally containing sodium chloride salt, at about room temperature, for periods up to about 24 hours to produce flavor concentrates with strong, medicinal, salty, shrimp-like or marine flavors. Addition of about 1 to about 1000 parts per billion of this flavor concentrate to tomato-based sauces and other.

EXAMPLE 1

Free Alkylphenol Flavor Concentrate Produced From Dried Cheddar Cheese Whey Permeate and Sulfuric Acid For the preparation of a free alkylphenol flavor concentrates from dried whey permeate, 30 grams of dried whey permeate powder were suspended in quantities sufficient tapwater to yield 100 ml of each solution. The concentration is not highly critical for the reaction, but more concentrated solutions that will still boil properly provide higher flavors than lower concentration solutions. Sufficient concentrated sulfuric acid (37 N) was then added to each to achieve concentrations of sulfuric acid of approximately 0.1 N, 1.0 N, and 4.0 N, respectively, in the three solutions. The solutions were then heated under a reflux condensor at boiling (approximately 100° C.) for up to a total of 8 hours.

The efficiency of the hydrolyses was indexed by measuring combined p/m-cresols, and the results of the hydrolytic process treatments along with flavor assessments of the concentrated flavor preparations were:

| Sulfuric Acid | Concentration of Index Alkylphenols, p/m-cresols (ppb) As Is | | | | |
|---|---|---|---|---|---|
| Conc | Initial | 30 min | 2 hrs | 4 hrs | 8 hrs |
| 0.1N | 5 | 5 | 10 | 16 | 28 |
| Flavor | Whey | Whey | Whey | Whey | Whey |
| 1.0N | 5 | 517 | 852 | 1610 | 1407 |
| Flavor | Whey | Cowy-whey | cowy, sugary | Cowy-dairy | Cowy-dairy |
| 5.0N | 10 | 820 | 1074 | 877 | 291 |
| Flavor | Whey | Sugary-cowy | Cowy-sugary | Cowy | Cowy |

From these results, the preferred process for sulfuric acid hydrolysis is 1.0 N Sulfuric acid conditions in a solution of whey powder (30%), heating for at least 4 hours, but not more than 8 hours under boiling reflux conditions (about 100° C.) to produce concentrates that gave high flavor potency and unmasked alkylphenol-dairy flavors. The free alkylphenol flavor concentrates are applied at a rate sufficient to provide from 5 to5 ppb p/m-cresols in the finished food product, and preferably the 5 ppb level is used to give a desired flavor.

EXAMPLE 2

Free Alkylphenol Flavor Concentrate Produced From Dried Buttermilk and Sulfuric Acid For the preparation of a free alkylphenol flavor concentrates from dried buttermilk, 30 grams of dried buttermilk powder was suspended in a quantity sufficient tapwater to yield 100 ml of solution. The concentration is not highly critical for the reaction, but more concentrated solutions that will still boil properly provide higher flavors than lower concentration solutions. Sufficient concentrated sulfuric acid (37 N) was then added to achieve a concentration of sulfuric acid of approximately 1.0 N in the solution. The solution was then heated under a reflux condensor at boiling (approximately 100° C.) for 6 hours. The efficiency of the hydrolyses was indexed by measuring combined p/m cresols, and the results of the hydrolytic process treatment along with flavor assessment of the concentrated flavor preparation were:

| Sulfuric Acid | Concentration of Index Alkylphenols, p/m-cresols (ppb) As Is | |
|---|---|---|
| Conc | Initial | 8 hrs |
| 1.0N | 12 | 567 |
| Flavor | Sweet buttermilk | Cowy-dairy |

These results illustrate that powdered buttermilk provides a concentrated alkylphenol-dairy flavor concentrate, but its concentration is restricted compared to other raw materials. The free alkylphenol flavor concentrate is applied at a rate sufficient to provide from 5–15 ppb p/m-cresols in the finished food product, and preferably the 5 ppb level is used to give the desired flavor.

EXAMPLE 3

Free Alkylphenol Flavor Concentrate Produced From Dried Whey Powder and Sulfuric Acid For the preparation of a free alkylphenol flavor concentrates from dried whey powder, 30 grams of dried whey powder was suspended in a quantity sufficient tapwater to yield 100 ml of solution. The concentration is not highly critical for the reaction, but more concentrated solutions that will still boil properly provide higher flavors than lower concentration solutions. Sufficient concentrated sulfuric acid (37 N) was then added to achieve a concentration of sulfuric acid of approximately 1.0 N in the solution. The solution was then heated under a reflux condensor at boiling (approximately 100° C.) for 6 hours. The efficiency of the hydrolyses was indexed by measuring combined p/m cresols, and the results of the hydrolytic process treatment along with flavor assessment of the concentrated flavor preparation were:

| Sulfuric Acid | Concentration of Index Alkylphenols, p/m-cresols (ppb) As Is | |
|---|---|---|
| Conc | Initial | 8 hrs |
| 1.0N Flavor | 12 Whey | 232 Cowy-dairy |

These results illustrate that powdered whey provides a concentrated alkyiphenol-dairy flavor concentrate, but its concentration is restricted compared to other raw materials. The free allylphenol flavor concentrate is applied at a rate sufficient to provide from 5–15 ppb p/m-cresols in the finished food product, and preferably the 5 ppb level is used to give the desired flavor.

EXAMPLE 4

Free Alkylphenol Flavor Concentrate Prepared From Delactosed Cheese Whey Permeate Syrup and Sulfuric Acid For the preparation of a free alkylphenol flavor concentrates from delactosed cheese whey permeate syrup, 75 grams of delactosed cheese whey permeate syrup were diluted with 25 grams tapwater. The concentration is not highly critical for the reaction, but more concentrated solutions that will still boil properly provide higher flavors than lower concentration solutions. Sufficient concentrated sulfuric acid (37 N) was then added to achieve a concentration of sulfuric acid of approximately 1.0 N in the solution. The solution was then heated under a reflux condensor at boiling (approximately 100° C.) for 6 hours. The efficiency of the hydrolyses was indexed by measuring combined p/m cresols, and the results of the hydrolytic process treatment along with flavor assessment of the concentrated flavor preparation were:

| Sulfuric Acid | Concentration of Index Alkylphenols, p/m-cresols (ppb) As Is | |
|---|---|---|
| Conc | Initial | 6 hrs |
| 1.0N Flavor | 12 Sugary-whey | 6,556 Cowy-dairy |

These results illustrate that delactosed cheese whey permeate syrup provides an extremely concentrated alkylphenol-dairy flavor concentrate when hydrolyzed with sulfuric acid. The free alkylphenol flavor concentrate is applied at a rate sufficient to provide from 5–15 ppb p/m-cresols in the finished food product, and preferably the 5 ppb level is used to give the desired flavor.

EXAMPLE 5

Free alkylphenol Flavor Concentrates Prepared From Delactosed Cheese Whey Permeate Syrup and Phosphoric Acid and Autoclaved For the preparation of a free alkylphenol flavor concentrates from delactosed cheese whey permeate syrup, 75 grams of delactosed cheese whey permeate syrup were diluted with 25 grams tapwater. The concentration is not highly critical for the reaction, but more concentrated solutions that will still boil properly provide higher flavors than lower concentration solutions. Sufficient concentrated phosphoric acid (17 N) was then added to achieve a concentration of phosphoric acid of approximately 2.0 N in the solution. The solution was then heated under pressure at 121 ° C. for 1, 2, or 4 hr. The efficiency of the hydrolyses was indexed by measuring combined p/m cresols, and the results of the hydrolytic process treatment along with flavor assessment of the concentrated flavor preparation were:

| Phosphoric Acid | Concentration of Index Alkylphenols, p/m-cresols (ppb) As Is | | | |
|---|---|---|---|---|
| Conc | Initial | 1 hr | 2 hrs | 8 hrs |
| 2.0N Flavor | 22 Sugary-whey | 3,800 Cowy-dairy | 6,290 Cowy-dairy | 2,650 Cowy-dairy |

These results illustrate that delactosed cheese whey permeate syrup provides an extremely concentrated alkylphenol-dairy flavor concentrate when hydrolyzed with phosphoric acid under autoclave heating. The preferred hydrolysis time is 2 hours at 121 ° C. The free alkylphenol flavor concentrate is applied at a rate sufficient to provide from 5–15 ppb p/m-cresols in the finished food product, and preferably the 5 ppb level is used to give the desired flavor.

EXAMPLE 6

Free alkylphenol Flavor Concentrate Prepared From Delactosed Cheese Whey Permeate Syrup and Phosphoric Acid For the preparation of a free alkylphenol flavor concentrates from delactosed cheese whey permeate syrup, 75 grams of delactosed cheese whey permeate syrup were diluted with 25 grams tapwater. The concentration is not highly critical for the reaction, but more concentrated solutions that will still boil properly provide higher flavors than lower concentration solutions. Sufficient concentrated phosphoric acid (17 N) was then added to achieve a concentration of phosphoric acid of approximately 2.0 N in the solution. The solution was then heated under a reflux condensor at boiling (approximately 100° C.) for up to 8 hours. The efficiency of the hydrolyses was indexed by measuring combined p/m cresols, and the results of the hydrolytic process treatment along with flavor assessment of the concentrated flavor preparation were:

| Phosphoric Acid | Concentration of Index Alkylphenols, p/m-cresols (ppb) As Is | | | |
|---|---|---|---|---|
| Conc | Initial | 4 hrs | 6 hrs | 5 hrs |
| 2.0N | 29 | 4,600 | 6,970 | 5,390 |
| Flavor | Sugary-whey | Cowy-dairy | Cowy-dairy | Cowy-dairy |

These results illustrate that delactosed cheese whey permeate syrup provides an extremely concentrated alkylphenol-dairy flavor concentrate when hydrolyzed with phosphoric acid. The preferred hydrolysis time is 4–8 hours under reflux, with 6 hours preferred. The free alkylphenol flavor concentrate is applied at a rate sufficient to provide from 5–15 ppb p/m-cresols in the finished food product, and preferably the 5 ppb level is used to give the desired flavor.

EXAMPLE 7

Free Alkyiphenol Flavor concentrate Prepared From Gusto® (Grande Cheese Co. Plymouth. Wis.) and Phosphoric Acid For the preparation of a free alkylphenol flavor concentrates from Gusto® (Grande Cheese Co.), 100 grams of Gusto® was acidified with sufficient concentrated phosphoric acid (17 N) to achieve a concentration of phosphoric acid of approximately 2.0 N in the solution. The solution was then heated under a reflux condensor at boiling (approximately 100° C.) for 6 hours. The efficiency of the hydrolyses was indexed by measuring combined p/m cresols, and the results of the hydrolytic process treatment along with flavor assessment of the concentrated flavor preparation were:

| Phosphoric Acid | Concentration of Index Alkylphenols, p/m-cresols (ppb) As Is | |
|---|---|---|
| Conc | Initial | 6 hrs |
| 2.0N | 255 | 4,800 |
| Flavor | Sugary-Savory-Cowy | 1 Cowy-dairy |

These results illustrate that Gusto® provides an extremely concentrated alkylphenol-dairy flavor concentrate when hydrolyzed with phosphoric acid with the preferred hydrolysis time of 6 hours under reflux was used. The free alkylphenol flavor concentrate is applied at a rate sufficient to provide from 5–15 ppb p/m-cresols in the finished food product, and preferably the 5 ppb level is used to give the desired flavor.

EXAMPLE 8

Free alkyiphenol Flavor Concentrate Prepared From Gusto® (Grande Cheese Co. Plymouth, Wis. and Sulfuric Acid For the preparation of a free alkylphenol flavor concentrates from Gusto® (Grande Cheese Co.), 100 grams of Gusto® was acidified with sufficient concentrated sulfuric acid (37 N) to achieve a concentration of phosphoric acid of approximately 1.0 N in the solution. The solution was then heated under a reflux condensor at boiling (approximately 100° C.) for 6 hours. The efficiency of the hydrolyses was indexed by measuring combined p/m cresols, and the results of the hydrolytic process treatment along with flavor assessment of the concentrated flavor preparation were:

| Sulfuric Acid | Concentration of Index Alkylphenols, p/m-cresols (ppb) As Is | |
|---|---|---|
| Conc | Initial | 6 hrs |
| 2.0N | 146 | 5532 |
| Flavor | Sugary-Savory-Cowy | Cowy-dairy |

These results illustrate that Gusto® provides an extremely concentrated alkylphenol-dairy flavor concentrate when hydrolyzed with sulfuric acid with the preferred hydrolysis time of 6 hours under reflux was used. The free alkylphenol flavor concentrate is applied at a rate sufficient to provide from 5–15 ppb p/m-cresols in the finished food product, and preferably the 5 ppb level is used to give the desired flavor.

EXAMPLE 9

Free Alkylphenol Flavor concentrate Prepared From Delactosed Sheep's Milk Cheese Whey Permeate and Phosphoric Acid For the preparation of a free alkylphenol flavor concentrates from delactosed sheep's milk cheese whey permeate syrup, 75 grams of delactosed sheep's milk cheese whey permeate syrup were diluted with 25 grams tapwater. The concentration is not highly critical for the reaction, but more concentrated solutions that will still boil properly provide higher flavors than lower concentration solutions. Sufficient concentrated phosphoric acid (17 N) was then added to achieve a concentration of phosphoric acid of approximately 2.0 N in the solution. The solution was then heated under a reflux condensor at boiling (approximately 100° C.) for 6 hours. The efficiency of the hydrolyses was indexed by measuring combined p/m cresols, and the results of the hydrolytic process treatment along with flavor assessment of the concentrated flavor preparation were:

| Phosphoric Acid | Concentration of Index Alkylphenols, p/m-cresols (ppb) As Is | |
|---|---|---|
| Conc | Initial | 6 hrs |
| 2.0N | 16 | 6,970 |
| Flavor | Sugary-whey | Sheepy-dairy |

These results illustrate that delactosed sheep's cheese whey permeate syrup provides an extremely concentrated alkylphenol-dairy flavor concentrate when hydrolyzed with phosphoric acid. The preferred hydrolysis time is 4–8 hours under reflux, with 6 hours most preferred. The free alkylphenol flavor concentrate is applied at a rate sufficient to provide from 5–15 ppb p/m-cresols in the finished food product, and preferably the 5 ppb level is used to give the desired flavor.

EXAMPLE 10

Free alkylphenol Flavor Concentrate Prepared From Delactosed Goat's Milk Cheese Whey Permeate and Phosphoric Acid For the preparation of a free alkylphenol flavor concentrates from delactosed goat's milk cheese whey permeate syrup, 75 grams of delactosed goat's milk cheese whey permeate syrup were diluted with 25 grams tapwater. The concentration is not highly critical for the reaction, but more concentrated solutions that will still boil properly provide higher flavors than lower concentration solutions. Sufficient concentrated phosphoric acid (17 N) was then added to achieve a concentration of phosphoric acid of approximately 2.0 N in the solution. The solution was then heated under a reflux condensor at boiling (approximately 100° C.) for 6 hours. The efficiency of the hydrolyses was indexed by measuring combined p/m cresols, and the results of the hydrolytic process treatment along with flavor assessment of the concentrated flavor preparation were:

| Phosphoric Acid | Concentration of Index Alkylphenols, p/m-cresols (ppb) As Is | |
| --- | --- | --- |
| Conc | Initial | 6 hrs |
| 2.0N | 52 | 12,892 |
| Flavor | Sugary-whey-goaty | Goaty-dairy |

These results illustrate that delactosed goat's milk cheese whey permeate syrup provides an extremely concentrated alkylphenol-dairy flavor concentrate when hydrolyzed with phosphoric acid. The preferred hydrolysis time is 4–8 hours under reflux, with 6 hours most preferred. The free alkylphenol flavor concentrate is applied at a rate sufficient to provide from 5–15 ppb p/m-cresols in the finished food product, and preferably the 5 ppb level is used to give the desired flavor.

EXAMPLE 11

Addition of 0.5% of spray-dried permeate by dusting onto either fresh or frozen french fried potatoes providing about 5 ppb of p/m-cresol, and then frying in a deep-fat fryer using soybean oil, provides a full, tallowy, beefy flavor to french fries that resembles that provided by frying in beef tallow.

EXAMPLE 12

Addition of 0.5% of spray-dried permeate by dusting onto either fresh or frozen french fried potatoes providing about 5 ppb of p/m-cresol, and then frying in a deep-fat fryer using soybean oil containing about 0.1% of the free alkylphenol flavor concentrate prepared from Gusto® in Example 8 above, plus 0.1% of a lipolyzed butter oil (LBO 50®, SKW, Waukesha, Wis.), provides a full, tallowy, beefy flavor to french fries that is similar to that provided by frying in beef tallow.

EXAMPLE 13

Addition of 0.1% of the free alkylphenol flavor concentrate prepared from delactosed cheese whey permeate syrup prepared in accordance with Example 4 provides about 6.5 ppb of p/m cresol to non-fat cream cheese, and the flavor of the non-fat cream cheese is enhanced by providing a full, milky flavor sensation that resembles regular cream cheese.

EXAMPLE 14

Addition of 0.1% of the free alkylphenol flavor concentrate prepared from delactosed cheese whey permeate syrup prepared in accordance with Example 4 provides about 6.5 ppb of p/m-cresol to skim milk, and the flavor of the skim milk is enhanced by providing a full, milky flavor sensation that resembles whole milk-like flavor.

EXAMPLE 15

Addition of 0.1% of the free alkylphenol flavor concentrate prepared from delactosed cheese whey permeate syrup prepared in accordance with Example 4 provides about 6.5 ppb of p/m-cresol to simulated meat crumbles prepared with soy beans (Smart Ground®, Lightlife Foods, Turner Falls, Mass.), and the flavor of the meat crumbles after frying is enhanced by providing a full fatty beefy flavor sensation that resembles regular beef hamburger.

EXAMPLE 16

Addition of 0.1% of the free alkylphenol flavor concentrate prepared from Gusto® described in Example 8 above provides about 5.5 ppb of p/m-cresol to skim milk, and the flavor of the skim milk is enhanced by providing a full, milky flavor sensation that resembles whole milk-like flavor.

EXAMPLE 17

Addition of 0.1% of the free alkylphenol flavor concentrate prepared from Gusto® described in Example 8 above provides about 5.5 ppb of p/m-cresol to skim milk, and the flavor of the skim milk is enhanced by providing a full, milky flavor sensation that resembles whole milk-like flavor. The flavor is further improved by adding 0.1% of a lipolyzed whole cream powder (Cream Plus®, Butter Buds, Racine, Wis.), 0.1% of a lipolyzed butter oil (LBO 50®, SKW, Waukesha, Wis.), and 0.005% of a pyrolyzed vegetable oil (Grillin®, Red Arrow Products, Manitowoc, Wis.) to provide a an overall flavor that closely resembles 2% fat milk.

EXAMPLE 18

Addition of 0.1% of the free alkylphenol flavor concentrate prepared from Gusto® described in Example 8 above provides about 5.5 ppb of p/m-cresol to non-fat cream cheese, and the flavor of the non-fat cream cheese is enhanced by providing a full, milky flavor sensation that resembles regular cream cheese.

EXAMPLE 19

Addition of 0.1% of the free alkylphenol flavor concentrate prepared from Gusto® described in Example 8 above provides about 5.5 ppb of p/m-cresol to low-fat Cheddar cheese, and the flavor of the low-fat Cheddar cheese is enhanced by providing a full, mild milky-cheesey flavor sensation that resembles regular mild Cheddar cheese.

EXAMPLE 20

Addition of 0.1% of the free alkylphenol flavor concentrate prepared from Gusto® described in Example 8 above provides about 5.5 ppb of p/m-cresol to low-fat soft-serve ice cream, and the flavor of the low-fat soft-serve ice cream is enhanced by providing a full, rich flavor sensation that resembles regular soft-serve ice cream.

EXAMPLE 21

Addition of 0.1% of the free alkylphenol flavor concentrate prepared from Gusto® described in Example 8 above provides about 5.5 ppb of p/m-cresol to creamery butter, and the flavor of the creamery butter is enhanced by providing a potentiated, rich-buttery flavor sensation that improves the flavor strength and identity of the butter.

EXAMPLE 22

Addition of 0.1% of the free alkylphenol flavor concentrate prepared from Gusto® described in Example 8 above provides about 5.5 ppb of p/m-cresol to margarine, and the flavor of the margarine is enhanced by providing a rich-buttery flavor sensation that resembles regular butter.

EXAMPLE 23

Addition of 0.1% of the free alkylphenol flavor concentrate prepared from Gusto® described in Example 8 above provides about 5.5 ppb of p/m-cresol to non-dairy coffee creamer, and the flavor of the non-dairy coffee is enhanced by providing a full, milky flavor sensation that resembles that provided by regular cream.

EXAMPLE 24

Addition of 0.1% of the free alkylphenol flavor concentrate prepared from Gusto® described in Example 8 above provides about 5.5 ppb of p/m-cresol to butter cookies, and the flavor of the butter cookies is enhanced by providing an enhanced full, baked-butter flavor sensation.

EXAMPLE 25

Addition of 0.1% of the free alkylphenol flavor concentrate prepared from Gusto® described in Example 8 above provides about 5.5 ppb of p/m-cresol to shortening sugar cookies, and the flavor of the shortening sugar cookies is enhanced by providing a baked-butter flavor sensation that resembles that provided by regular butter.

EXAMPLE 26

Addition of 0.1% of the free alkylphenol flavor concentrate prepared from Gusto® described in Example 8 above provides about 5.5 ppb of p/m-cresol to butter toffee, and the flavor of the butter toffee is enhanced by providing a full, milky flavor sensation.

EXAMPLE 27

Addition of 0.1% of the free alkylphenol flavor concentrate prepared from Gusto® described in Example 8 above provides about 5.5 ppb of p/m-cresol to vegetable fat toffee, and the flavor of the non-dairy toffee is enhanced by providing a full, milky flavor sensation that resembles that provided by regular butter.

EXAMPLE 28

Addition of 0.1% of the free alkylphenol flavor concentrate prepared from Gusto® described in Example 8 above provides about 5.5 ppb of p/m-cresol to milk chocolate, and the flavor of the milk chocolate is enhanced by providing a full, milky flavor sensation that resembles that provided by regular full-fat milk or milk solids.

EXAMPLE 29

Addition of 0.1% of the free alkylphenol flavor concentrate prepared from sheep's milk delactosed cheese whey permeate described in Example 9 above provides about 5.5 ppb of p/m-cresol to non-fat cream cheese, and the flavor of the non-fat cream cheese is enhanced by providing a full, milky sheep's milk-like flavor sensation that resembles regular soft sheep's milk cheese.

EXAMPLE 30

Addition of 0.005% of the free alkylphenol flavor concentrate prepared from goats's milk delactosed cheese whey permeate described in Example 9 above provides about 5.5 ppb of p/m-cresol to non-fat cream cheese, and the flavor of the non-fat cream cheese is enhanced by providing a full, milky goat's milk-like flavor sensation that resembles regular soft goat's milk cheese.

EXAMPLE 31

Addition of 0.1% of the free alkylphenol flavor concentrate prepared from Gusto® described in Example 8 above provides about 5.5 ppb of p/m-cresol to soy milk, and the flavor of the soy milk is enhanced by providing a full, milky flavor sensation that resembles whole milk-like flavor.

EXAMPLE 32

Addition of 0.1% of the free alkylphenol flavor concentrate prepared from Gusto® described in Example 8 above provides about 5.5 ppb of p/m-cresol to simulated meat crumbles prepared with soy beans (Smart Ground®, Lightlife Foods, Turner Falls, Mass.), and the flavor of the meat crumbles after flying is enhanced by providing a full, fatty, beefy flavor sensation that resembles regular beef hamburger.

It is understood that the invention is not limited to the particular construction and arrangement of parts herein illustrated and described, but embraces such modified forms thereof as come within the scope of the following claims.

I claim:

1. A process for preparing a free alkylphenol flavor concentrate, comprising reacting an aqueous solution comprising a raw material containing bound metabolic alkylphenol conjugates with a mineral acid.

2. The process of claim 1, wherein the mineral acid is present in an amount from about 0.5N to about 5N.

3. The process of claim 1, where the raw material is selected from the group consisting of ruminant milk, buttermilk, whey, whey permeate, delactosed whey permeate, and ruminant urine.

4. The process of claim 1, further comprising the steps of:
   reacting the aqueous solution with the mineral acid at a temperature greater than about 50° C.

5. The process of claim 1, wherein the aqueous solution is reacted with the mineral acid from between about 1 hour to about 8 hours.

6. A process of preparing a free alkylphenol flavor concentrate comprising reacting an aqueous solution comprising a raw material containing bound metabolic alkylphenol conjugates with a mineral acid for a time sufficient to form a free alkylphenol flavor concentrate having at least about 500 parts per billion of p/m-cresol.

7. The process of claim 6, wherein the total free alkylphenol concentration is at least about 2000 parts per billion.

8. The process of claim 6, where the raw material is selected from the group consisting of ruminant milk, buttermilk, whey, whey permeate, delactosed whey permeate, and ruminant urine.

9. The process of claim 6, further comprising the step of:
   reacting the aqueous solution with the mineral acid at a temperature of at least about 50° C.

* * * * *

UNITED STATES PATENT AND TRADEMARK OFFICE
CERTIFICATE OF CORRECTION

PATENT NO. : 6,391,364 B1
DATED : May 21, 2002
INVENTOR(S) : Robert C. Lindsay

It is certified that error appears in the above-identified patent and that said Letters Patent is hereby corrected as shown below:

Title Page,
Item [57], ABSTRACT, "A process for preparing a free alkylphenol flavor concentrate, including the steps of reacting an aqueous solution comprising a raw material containing bound alkylphenol conjugates with a mineral acid, and the use of free alkylphenols and free alkylphenol concentrates as flavor enhancers in a wide variety of food products." should read -- A process for preparing a free alkylphenol flavor concentrate, comprising the steps of reacting an aqueous solution comprising a raw material containing bound alkylphenol conjugates with a mineral acid, and the use of free alkylphenols and free alkylphenol concentrates as flavor enhancers in a wide variety of food products. --.

Column 2,
Line 67, please delete "mineral".

Column 3,
Line 21, please insert -- be -- after "to".
Line 43, "alkyiphenols" should read -- alkylphenols --.

Column 5,
Line 18, "material" should read -- material, --.
Line 21, please delete "is required and".

Column 6,
Line 44, after "specific", please insert -- alkylphenols are associated with specific flavors, it is possible to achieve a desired flavor in a given food product by addition of the appropriate amount of alkylphenol. Among the alkylphenols useful in this application are p-cresol, m-cresol, p-ethlyphenol, m-ethylphenol, and m-propylphenol. The individual alkylphenols may be present in an amount of from about 0.1 parts per billion to about 50 parts per billion. The synthetic alkylphenols are added to the food product and the resulting mixture is mixed until homogeneous.
   Tables 1-7 show the flavor impact of the alkylphenols on food products and the correlation between the concentration of alkylphenol and the resulting flavor. --.
TABLE 1, line 56, "d-ethylphenol" should read -- 4-ethylphenol --.

Column 7,
TABLE 2, line 30, "3-$\alpha$-pr." should read -- 3-n-pr. --.

UNITED STATES PATENT AND TRADEMARK OFFICE
CERTIFICATE OF CORRECTION

PATENT NO. : 6,391,364 B1
DATED : May 21, 2002
INVENTOR(S) : Robert C. Lindsay

It is certified that error appears in the above-identified patent and that said Letters Patent is hereby corrected as shown below:

Column 8,
TABLE 5, line 30, "3-α-propylphenol" should read -- 3-n-propylphenol --.
TABLE 5, line 36, "(csp." should read -- (esp. --.

Column 9,
TABLE 6, line 23, "5-n-propylphenol" should read -- 3-n-propylphenol --.
TABLE 7, line 40, "(csp," should read -- (esp. --.

Column 10,
TABLE 8, line "3-n Butylphenol" should read -- 3-n-Butylphenol --.
Line 20, "mn-substituted" should read -- $m$-substituted --.
Line 23, "flavors" should read -- flavors, --.
Line 27, "m-substituted" should read -- $m$-substituted --.
TABLE 9, line 49, please delete "p-cresol notable".
TABLE 9, line 50, please insert -- p-cresol notable -- under the "Comment" column.
TABLE 9, line 52, please delete "Animal odor".
TABLE 9, line 53, please delete "Sheepy".
TABLE 9, line 53, please insert -- Animal odor -- under the "Comment" column.
TABLE 9, line 54, please insert -- Sheepy -- under the "Comment" column.
TABLE 9, line 55, please delete, "Sheepy".
TABLE 9, line 56, please delete, "Should increase 3 npr".
TABLE 9, line 56, please insert -- Sheepy -- under the "Comment" column.
TABLE 9, line 57, please insert -- Should increase 3 npr -- under the "Comment" column.
TABLE 9, line 65, please delete "Good. but slightly sleepy".
TABLE 9, line 66, please insert -- Good, but slightly sleepy -- under the "Comment" column.

Column 11,
TABLE 9, line 9, please delete "Best trial".
TABLE 9, line 10, please insert -- Best trial -- under the "Comment" column.
Line 54, after "other", please insert -- products induces shrimp-like flavors to the products. An example of such a compound is 2,6-dibromophenol, an important sea-like characterizing flavor compound in shrimp. --.

UNITED STATES PATENT AND TRADEMARK OFFICE
CERTIFICATE OF CORRECTION

PATENT NO. : 6,391,364 B1
DATED : May 21, 2002
INVENTOR(S) : Robert C. Lindsay

It is certified that error appears in the above-identified patent and that said Letters Patent is hereby corrected as shown below:

Column 12,
Line 6, "The efficiency..." should not start a new paragraph.
Line 31, "5 to5" should read -- 5 to 15 --.

Column 13,
Line 39, "alkyiphenol-dairy" should read -- alkylphenol-dairy --.

Column 15,
Line 16, "5 hrs" should read -- 8 hrs --.
Line 30, "Alkyiphenol" should read -- Alkylphenol --.
Line 51, "1 Cowy-dairy" should read -- Cowy-dairy --.
Line 63, "alkyiphenol" should read -- alkylphenol --.
Line 64, "Wis." should read --Wis.) --.

Column 18,
Line 30, please delete "a".

Column 19,
Line 66, "goats's" should read -- goat's --.

Signed and Sealed this

Twenty-fifth Day of March, 2003

JAMES E. ROGAN
*Director of the United States Patent and Trademark Office*